United States Patent Office 3,752,774
Patented Aug. 14, 1973

3,752,774
ZIRCONIA-SILICA-PROMOTED COBALT
OXIDE CATALYST
Alvin B. Stiles, Wilmington, Del., assignor to E. I. du Pont
de Nemours and Company, Wilmington, Del.
No Drawing. Filed June 7, 1971, Ser. No. 150,790
Int. Cl. B01j 11/06
U.S. Cl. 252—462　　　　　　　　　　　　　　8 Claims

ABSTRACT OF THE DISCLOSURE

The activity of cobalt, nickel or iron oxide catalysts is improved if the catalyst contains as a promoter, 0.1–10% zirconia or 0.1–5% ceria, and the catalyst is prepared by being precipitated from a solution having a pH below 7.35. Further improvements in activity are obtained if the zirconia or ceria promoted catalyst also contains 0.08–1% of silica as a co-promoter.

BACKGROUND OF THE INVENTION

Promoted nickel and cobalt oxide catalysts are known in the art and have been used for many hydrogenation reactions, e.g., the hydrogenation of adiponitrile to hexamethylenediamine. U.S. Pat. 2,776,315 discloses promoted cobalt oxide catalysts and teaches that useful promoters include silica, titania, alumina and thoria, particularly silica, U.S. Pat. 3,235,515 to Taylor discloses metallic nickel and cobalt catalysts promoted with zirconium compounds.

SUMMARY OF THE INVENTION

I have disclosed that cobalt, nickel or iron oxide catalysts having improved catalytic activity and improved resistance to breakage can be obtained if the catalytic oxide is promoted with 0.1 to 10% by weight based on the oxide, of zirconia, or 0.1 to 5% by weight based on the oxide of ceria and the catalysts are prepared by being precipitated from a solution having a pH below 7.35. Further the catalysts should not contain other ions that will not volatilize at 500° C. or below.

The catalyst activity is further improved if the zirconia or ceria promoted catalyst contains 0.08 to 1% by weight based on the catalytic oxide content, of silica in the form of a sol or gel as a co-promoter.

The most preferred catalysts are the cobalt oxide catalysts promoted with zirconia or zirconia promoted cobalt oxide catalyst additionally containing silica as a co-promoter.

The catalysts of the invention are useful for hydrogenation reactions, they are particularly useful for the hydrogenation of adiponitrile to hexamethylenediamine either in the presence or absence of ammonia.

DESCRIPTION OF THE INVENTION

The subject invention is directed to the use of zirconia ($ZrO_2$) or ceria ($CeO_2$) as promoters for catalysts containing cobalt oxide, nickel oxide, iron oxide, or mixtures of these catalytic oxides. The invention further is directed to these promoted catalysts containing in addition silica as a co-promoter.

The promoters are present in the promoted catalysts of the invention in the following proportions: zirconia in proportions from 0.1–10% or ceria from 0.1–5% based on the so-called reducible or catalytic oxides content of the catalytic composite. Ordinarily at least 1% zirconium oxide is added but smaller quantities can be used, especially when larger quantities of silica are employed. However, ordinarily the quantity of zirconia is not catalytically beneficial when added to a level much above 10%.

The method of preparation of the promoted catalysts of the invention is important. The catalyst should be prepared by being precipitated from a solution having a pH below 7.35. Further the catalyst should not contain, other than the natural amount of impurities present, other ions that will not volatilize at 500° C. or below, e.g., sulfate ions. Thus the zirconia and ceria can be incorporated by coprecipitation with the reducible oxide component with the zirconia and ceria being derived from their nitrate, acetate or formate salts. The chloride and sulfate salts are avoided because of the contaminating influence of the sulfate or chloride ion and its adverse effect on the catalytic activity of the resultant catalyst.

As indicated above, the incorporation of the zirconia or ceria is normally performed by coprecipitation from the soluble salts of the respective catalytic and promoting metals using as precipitant, ammonium carbonate or ammonia and carbon dioxide gas because of the minimization of occlusion of cationic impurities. The use of these preparation procedures will result in a high yield of usable catalyst based on the amount of catalytic materials in the solution.

The promoters are useful for the activation of cobalt oxide, iron oxide or nickel oxide or mixtures of these three catalytic oxides in varying proportions. The selection of the mixture and promoter quantity will depend upon the type of operation for which the catalyst is to be used and the temperature and pressure employed.

The cobalt, nickel or iron oxides can be derived from the pure oxides themselves which in turn can be obtained from ore smelting refineries or they can be derived by calcining the nitrate, formate, and acetate salts.

In a preferred embodiment, the promoted catalyst of the invention will contain in addition 0.08 to 1% by weight, based on the catalytic oxide content, of silica as a co-promoter. This silica can be derived from sodium meta-silicate, potassium silicate, lithium silicate or colloidal silica. Although not preferred, other useful co-promoters are the titania, alumina and thoria of U.S. Pat. 2,776,315.

The quantity of silica can be varied from as low as 0.08% or as high as 0.25% when using the acidified sodium metasilicate addition technique. If, however, there is used colloidal silica of the type designed in the trade as Ludox®, the quantity of silica can be increased to above 1% without encountering severe adverse structural effect on the resultant catalyst.

The catalysts can be used in the form of powders, reduced powders, fused granules, extruded or pelleted oxides and the latter after they had been sintered by exposure to temperatures from 500–1200° C. in oxidizing, neutral or reducing environment. The preferred sintering temperature range is from 600–750° C. and the temperature used is dependent upon the density, hardness and intrinsic activity needed.

In making pellets of the catalysts of the invention, it is often advantageous to incorporate a pelleting agent to provide for ease of pelleting and pellets of increased strength. The animal and vegetable stearate disclosed in U.S. Pat. 2,570,882 are particularly useful for this purpose.

The catalytic metal oxides can individually or in mixture be supported on finely divided, powdered supports or supports in the form of cylinders, rings, saddles, spirals or honeycomb, for example. The supports can be derived from alumina, aluminum hydroxide, diatomite, silica (this silica should ordinarily not be considered to be a co-promoter), spinel, zirconia (also should not ordinarily be considered to be a co-promoter), magnesia, beryllia, chromite, mullite, sillimanite or other typical supports. Coating of the support can be effected by slurrying the finely divided support material in the solution of the catalytically active materials prior to precipitation or by spraying, immersion or painting the support in or with a solution of the soluble salts followed by calcining to decompose the salts on and in the support.

The catalysts so derived are primarily useful after reduction for hydrogenation reactions, for example, the hydrogenation in either the presence or absence of gaseous or liquid ammonia of adiponitrile to hexamethylenediamine. They are also useful for other hydrogenations of nitriles to amines, dinitriles to diamines, nitro groups to amines, double bonds to saturated compounds, aldehydes to alcohols or alcohols to hydrocarbons. They are also useful for the hydrogenation of polyunsaturated compounds to more nearly saturated compounds without complete hydrogenation. This selective hydrogenation is performed under milder conditions and moderating circumstances known in the art. The catalysts, in their oxide form, are also useful as oxidation catalysts such as the complete oxidation of polluting gases from automobile engines or other sources such as industrial operating plants. They are also useful for selective oxidations such as the oxidative dehydrogenation of secondary alcohols to ketones.

The catalysts of the invention can be reduced by conventional processes, e.g., they can be reduced by passing hydrogen over them at elevated temperatures, e.g., 400° C. until the exit gas contains no water. Other reducing agents can, of course, be used.

The catalysts of the invention, as illustrated by the examples, are particularly useful for the hydrogenation of adiponitrile to hexamethylenediamine by passing hydrogen, ammonia, and adiponitrile over them at temperatures of 50° C. to 170° C. under super atmospheric pressures, e.g., 500 to 5000 p.s.i.g. or even higher.

The following examples are offered to illustrate the preparation and use of several embodiments of the catalysts of the invention. All parts are parts by weight unless otherwise indicated.

Example 1

A solution is prepared by dissolving 775 parts of cobalt nitrate hexahydrate in sufficient distilled water to produce 6000 parts of solution; that is 5225 parts of water is added. There is next added to the solution 30 parts of zirconyl nitrate solution having an assay of 20% zirconium oxide. This is sufficient zirconium oxide when precipitated with the cobalt to produce a 3% quantity of zirconium oxide based on cobalt oxide content. The solution at a pH of about 0.3, while being rapidly agitated, is next heated to 85° C. and sufficient ammonium bicarbonate as a powdered solid is added over a period of 30 minutes to raise the pH of the solution to 7.3. At this pH the cobalt should be precipitated as completely as possible without redissolving excessive quantities of the precipitate by forming cobalt ammine salts. The slurry is permitted to agitate at 85° C. for 1 hour, then is filtered and washed on the filter with 3000 parts of distilled water. The filter cake is dried, then is calcined at 400° C. for 2 hours after the temperature of the filter cake reaches 400° C.

The resultant cobalt oxide-zirconium oxide mixture is densified by kneading with water in commercially available kneading equipment. The water-wet dense paste is dried at 150° C. After drying and cooling, the densified cobalt oxide-zirconium oxide lumps are granulated to 100% through a 10 mesh screen; the resultant granular powder is mixed with powdered stearic acid (Sterotex®) equal to 3% of the weight of the granulated powder. After thoroughly mixing, the powder is formed into 1/8" x 1/8" cylinders by compression on a commercially available Stokes rotary tableting machine.

The thus formed pellets are placed in a 1/2" thick layer in an Inconel pan which in turn is placed in a furnace at 700° C. containing air and into which air is allowed to enter by convection. The pills are maintained at this temperature in an oxidizing atmosphere for a period of 3 hours. After the sintering operation they are permitted to cool and are then suitable for catalytic operations.

One such operation is to place the pills in a perforated basket and subject them to a reducing operation, for example by passing hydrogen at a temperature of 360° C. through the perforated basket which in turn is contained in a closed vessel except for a port at one end permitting the entrance of the reducing gas and a port at the other end for the discharge of the exhausted reducing gas. Reduction is effected for sufficient time and with sufficient flow to assure that the exit gas contains no water resulting from the reduction.

After reduction the perforated vessel is attached to a holder and is inserted in a high pressure vessel which has been charged with 100 parts by weight of adiponitrile, 75 parts by weight of anhydrous ammonia, together with the catalyst cartridge containing 20 parts by weight of catalyst when in the reduced condition. The pressure vessel is put in a shaking device which by reciprocal motion agitates rapidly the ammonia and adiponitrile in the vessel but the catalyst is held in a fixed position inside the vessel. The pressure within the vessel is raised to 5000 p.s.i. of hydrogen and the temperature adjusted to 135° C.; the hydrogenation reaction immediately initiates at this temperature and the hydrogen pressure gradually drops to 4500 p.s.i. The pressure is readjusted to 5000 p.s.i. and the temperature is maintained at 135–140° C. After all of the hydrogen has been absorbed that will react with the adiponitrile to form hexamethylene-diamine, the product is cooled and discharged from the unit.

A record is maintained of the rate and quantity of $H_2$ adsorption. The product is analyzed for unreacted adiponitrile, hexamethylenediamine and impurity content; the particulate matter broken off of the catalyst is also separated from the product and weighed. This test gives an indication of activity of the catalyst, its directivity and its resistance to breakage. The results are indicated in the tables that follow.

In another type (continuous feed) test, a reactor is set up which permits continuous feeding of adiponitrile plus ammonia and hydrogen into the bottom of a catalytic chamber and the withdrawal of gases and the product, hexamethylenediamine, from the effluent. This reactor permits a study of the longevity (rate of deactivation) of the catalyst as well as its resistance to breakage during continuous flow. The deactivation test is usually an indication of the characteristic of the catalyst to avoid the deposition of resinous or other poisoning materials within the catalyst pores. The results of this test are also indicated in the tables.

The preparation as described in the first paragraph of this example is repeated with the exception that instead of using 30 parts of the zirconyl nitrate, there is used only 10 parts of zirconyl nitrate; the product catalyst contains 1% $ZrO_2$ as promoter.

The first paragraph of this example is repeated with the exception that instead of using 30 parts of zirconyl nitrate, there is used 50 parts; this results in a cobalt oxide catalyst promoted with 5% $ZrO_2$.

The first paragraph of this example is repeated with the exception that instead of the 30 parts of zirconyl nitrate, 100 parts of zirconyl nitrate is used. All other parts of the example are followed as given above; this product is promoted with 10% $ZrO_2$.

Example 2

The procedure in the first paragraph of Example 1 is followed with the exception that instead of using the 30 parts of zirconium nitrate solution as described in Example 1, there is used 15.1 parts of cerium trinitrate hexahydrate to derive sufficient cerium oxide to be equivalent to 3% cerium dioxide on the basis of the cobalt oxide which is derived from the quantity of cobalt nitrate specified. The procedures for the ensuing operations are the same as described in subsequent paragraphs of Example 1.

Furthermore, to prepare a cobalt oxide catalyst promoted with 1% cerium dioxide, there is used 5.03 parts of cerium trinitrate hexahydrate. The procedures for the ensuing operations in the preparation of the catalyst are the same as described in subsequent paragraphs of Example 1.

Catalysts promoted with 5 and 10% cerium oxide can be prepared by following the procedures of the first paragraph of Example 1 but substituting 25.16 parts of cerium trinitrate hexahydrate when deriving a 5% promoted cerium oxide-cobalt oxide catalyst or 50.32 parts when deriving a catalyst promoted with 10% cerium dioxide.

It should be noted that the preparation of the catalyst described both in Examples 1 and 2 can be stopped after the calcining of the catalyst and the resultant powder, without compression into pellets can be reduced and converted into a catalyst useful in a slurry-type operation instead of the fixed bed described in Example 1.

A supported catalyst can be similarly produced by adding, prior to precipitation, 150 parts of finely divided (—325 mesh) diatomite.

Instead of diatomite there can be used aluminum hydroxide (alumina hydrate), alumina as gamma, alpha or other crystal form, molecular sieves (zeolites) or other typical supports.

Additionally, the salts as stipulated in the first paragraph of this example can be dissolved in only 1000 parts of distilled water. This solution can be used to coat supports in the form of cylinders, rods, ceramic fibers, asbestos, honeycomb or other typical supports of a size greater than a powder. Coating can be by immersion, spraying or multiple immersion with interim calcining to the oxides. Calcining is in all cases effected at 300° or above to decompose the soluble salts.

Example 3

A solution is prepared by dissolving 775 parts of cobalt nitrate hexahydrate in sufficient distilled water to be equivalent to 6000 parts total water and cobalt nitrate hexahydrate. There is next added to this solution 30 parts of zirconyl nitrate solution having an assay of 20% zirconium oxide. Next a 4% solution of sodium metasilicate, $Na_2SiO_3$, is made by dissolving sodium metasilicate or by diluting sodium metasilicate solution in sufficient distilled water to obtain a 4% solution.

27 parts of the 4% sodium metasilicate solution is acidified to a pH of 4 or below by the addition of nitric acid. Thereafter the acidified sodium metasilicate, now metasilicic acid, is added to the solution already containing the cobalt nitrate hexahydrate and the zirconyl nitrate salts.

The solution is rapidly agitated and heated to 85° C. and is then precipitated as stipulated in Example 1. Thereafter all operations of manufacture, reduction and testing are conducted as for Example 1. The product is promoted with 3% $ZrO_2$ and 0.13% $SiO_2$.

The quantity of zirconium oxide can also be varied as stipulated in Example 1. The zirconium oxide can be derived from the acetate and formate salts.

The catalysts so derived are useful for hydrogenation of adiponitrile to hexamethylenediamine and also for other hydrogenation and oxidation reactions.

Instead of the cobalt nitrate used above, a stoichiometrically equivalent amount of iron or nickel nitrate can be used; further mixtures of these metallic salts can also be used.

Example 4

The procedure followed in this example has as its objective the preparation of a cobalt oxide catalyst promoted with cerium oxide and silica. A solution is prepared containing 775 parts of cobalt nitrate, 5225 parts of distilled water, 15.1 parts of cerium trinitrate hexahydrate and 27 parts of 4% metasilicate solution acidified as described in Example 3 above. The precipitation and subsequent processing of this catalyst are performed identically to that described in Example 1 and the evaluations also are similarly conducted; the product is promoted with 3% $CeO_2$ and 0.13% $SiO_2$.

Instead of the 15.1 parts of cerium trinitrate hexahydrate stipulated above, there can be used 5.03 parts to derive a 1% promoted catalyst or 25.16 parts to derive a 5% promoted catalyst or 50.32 parts to derive a catalyst promoted with 10% cerium dioxide, all with 0.13% $SiO_2$ co-promoter. The cerium is present as the dioxide; however, it can further be present in other states of oxidation following the calcining and reduction.

The catalysts so derived are useful for hydrogenation or oxidation reactions as previously described in the specification and in the examples.

The catalysts as prepared in Examples 1 through 4 were examined for surface area after reduction using the B.E.T. surface area measurement technique. Results are tabulated in Table 1.

TABLE 1

| Promoter type and quantity: | Surface area, m.²/gram |
|---|---|
| 3% $ZrO_2$, Example 1 | 7.1 |
| 3% $CeO_2$, Example 2 | 5.7 |
| 3% $ZrO_2$, 0.13% $SiO_2$, Example 3 | 8.1 |
| 3% $CeO_2$, 0.13% $SiO_2$, Example 4 | 5.8 |
| 0.13% $SiO_2$ [a] | 4.5 |
| 1.0% $SiO_2$ [a] | 4.1 |
| 3.0% $SiO_2$ [b] | (c) |

[a] Silica promoted catalyst of U.S. 2,776,315.
[b] Silica promoted catalyst not within the scope of the invention.
[c] Completely disintegrated.

The catalysts as prepared in Examples 1 through 4 were examined for activity for adiponitrile hydrogenation to hexamethylenediamine by the methods described in Example 1. Results are tabulated in Table 2 below.

TABLE 2

| Promoter type and quantity: | Relative Activity |
|---|---|
| 3% $ZrO_2$, Example 1 | 205%. |
| 3% $CeO_2$, Example 2 | 160%. |
| 3% $ZrO_2$+0.13% $SiO_2$, Example 3 | 350%. |
| 3% $CeO_2$+0.13% $SiO_2$ Example 4 | 225%. |
| 0.13% $SiO_2$ [a] | 100%.[b] |
| 1.0% $SiO_2$ [a] | Severe disintegration.[c] |
| 3.0% $SiO_2$ [d] | Complete disintegration.[c] |

[a] Silica promoted catalyst of U.S. 2,776,315.
[b] Arbitrarily set as a standard 100%.
[c] Activity information invalidated by disintegration.
[d] Silica promoted catalyst not within the scope of the invention.

The catalysts as prepared in Examples 1 through 4 were examined for directivity (avoidance of by-product formation) by examining the product derived from the tests described in Example 1. The results are tabulated below in Table 3.

TABLE 3

| Promoter type and quantity: | By-products found in product, percent |
|---|---|
| 3% $ZrO_2$, Example 1 | 0.6 |
| 3% $CeO_2$, Example 2 | 0.7 |
| 3% $ZrO_2$+0.13% $SiO_2$ | 0.6 |
| 3% $CeO_2$+0.13% $SiO_2$ | 0.9 |
| 0.13% $SiO_2$ [a] | 1.6 |
| 1.00% $SiO_2$ [a] | 1.7 |
| 3.00% $SiO_2$ [b] | 1.9 |

[a] Silica promoted catalyst of U.S. 2,776,315.
[b] Silica promoted catalyst not within the scope of the invention.

The catalysts as prepared in Examples 1 through 4 were examined for rate of deactivation by examining them in the continuous unit described in Example 1. The results are in Table 4.

TABLE 4

| Promoter type and quantity: | Deactivation rate (reciprocal of run length) |
|---|---|
| 3% ZrO₂, Example 1 | 40 |
| 3% CeO₂, Example 2 | 91 |
| 3% ZrO₂+0.13% SiO₂ | 46 |
| 3% CeO₂+0.13% SiO₂ | 88 |
| 0.13% SiO₂ [a] | 100 |
| 1.0% SiO₂ [a] | 140 |
| 3.0% SiO₂ [b] | (c) |

[a] Silica promoted catalyst of U.S. 2,776,315.
[b] Silica promoted catalyst not within the scope of the invention.
[c] Completely disintegrated.

The catalysts as prepared in Examples 1 through 4 were examined by the shaker bomb technique to determine the amount of catalyst disintegration encountered during a standard test. (First of the tests as in Example 1.) The data are given below in Table 5.

TABLE 5

| Promoter type and quantity: | Percent <10 mesh [a] |
|---|---|
| 1% ZrO₂, Example 1 | 2.0 |
| 3% ZrO₂, Example 1 | 3.2 |
| 5% ZrO₂, Example 1 | 3.8 |
| 1% CeO₂, Example 2 | 4.6 |
| 3% CeO₂, Example 2 | 4.8 |
| 5% CeO₂, Example 2 | 5.9 |
| 3% ZrO₂+0.13% SiO₂, Example 3 | 2.6 |
| 3% CeO₂+0.13% SiO₂, Example 4 | 3.6 |
| 3% ZrO₂+0.30% SiO₂, Example 3 | 4.7 |
| 3% CeO₂+0.30% SiO₂, Example 4 | 5.2 |
| 0.13 SiO₂ [b] | 18.0 |
| 1.00% SiO₂ [b] | 46.0 |
| 3.00% SiO₂ [c] | (d) |

[a] Disintegration of catalyst during standard hydrogenation test of ADN to HMD.
[b] Silica promoted catalyst of U.S. 2,776,315.
[c] Silica promoted catalyst not within the scope of the invention.
[d] Complete disintegration.

The catalysts as prepared in Examples 1 through 4 were examined after reduction to determine the total pore volume of the catalyst pellets. This was determined by weighing a quantity of the pellets, immersing them for 5 minutes in boiling water, cooling the liquid and catalyst, removing the pellets and blotting them dry to external appearance, placing them immediately in a closed weighing vessel, weighing them then using the formula:

Total pore volume per gram $$= \frac{\text{weight of water soaked pellets in grams} - \text{original weight}}{\text{original weight in grams}}$$

Some of the results are given below in Table 6.

TABLE 6

| Promoter type and quantity: | Total pore volume/ml./gram |
|---|---|
| 3% ZrO₂, Example 1 | 0.53 |
| 3% CeO₂, Example 2 | 0.37 |
| 3% ZrO₂+0.13% SiO₂, Example 3 | 0.49 |
| 3% CeO₂+0.13% SiO₂, Example 4 | 0.47 |
| 0.13% SiO₂ [a] | 0.21 |
| 1.00% SiO₂ [a] | 0.09 |
| 3.00% SiO₂ [b] | 0.08 |

[a] Silica promoted catalyst of U.S. 2,776,315.
[b] Silica promoted catalyst not within the scope of the invention.

The catalysts as prepared in Examples 1 through 4 were evaluated for apparent density. The method used was to pack into a 100 ml. graduate a quantity of pellets which just reached the 100 ml. mark and remained there during further compaction by "shaking down." The weight of the 100 ml. volume of pellets was divided by 100 to obtain the apparent density which is tabulated for the catalysts in Table 7.

TABLE 7

| Promoter type and quantity: | Apparent density, grams/ml. |
|---|---|
| 3% ZrO₂, Example 1 | 2.30 |
| 3% CeO₂, Example 2 | 2.36 |
| 3% ZrO₂+0.13% SiO₂, Example 3 | 2.55 |
| 3% ZrO₂+0.13% SiO₂, Example 4 | 2.46 |
| 0.13% SiO₂ [a] | 2.95 |
| 1.00% SiO₂ [a] | 3.10 |
| 3.00% SiO₂ [b] | 3.15 |

[a] Silica promoted catalyst of U.S. 2,776,315.
[b] Silica promoted catalyst not within the scope of the invention.

I claim:
1. A densified and sintered particulate catalyst composition having improved catalytic activity and resistance to breakage which consists essentially of a catalytic metal oxide of the group consisting of cobalt, nickel and iron oxides, a promoter of the group consisting of zirconia and ceria, the zirconia being present in an amount corresponding to 0.1 to 10% by weight based on the weight of the catalytic metal oxide and ceria being present in an amount corresponding to 0.1 to 5% by weight based on the weight of the catalytic metal oxide, and a co-promoter consisting of silica in amount corresponding to 0.08 to 1% by weight based on the weight of the catalytic metal oxide, the catalyst composition being characterized in that it contains no other ions that will not volatilize at temperatures below 500° C.

2. The composition of claim 1 wherein the catalytic metal oxide is cobalt oxide.

3. The composition of claim 2 wherein the promoter is zirconia.

4. The composition of claim 2 wherein the promoter is ceria.

5. A process for making a catalytic metal oxide composition with improved catalytic activity and improved resistance to breakage, the metal oxide being of the class consisting of cobalt oxide, nickel oxide and iron oxide, which consists essentially of the steps of (a) preparing an aqueous solution of a salt of the metal, the salt being of the class consisting of nitrate, formate and acetate; adding to the solution a promoter of the class consisting of zirconia and ceria in the form of their salts of the class consisting of nitrate, formate and acetate, the amount of zirconia being from 0.1 to 10% by weight based on the weight of the metal oxide, the amount of ceria being from 0.1 to 5% by weight based on the weight of the metal oxide; adding to the solution a co-promoter consisting of silica in the form consisting of alkali metal silicates and colloidal silica, the amount of silica being from 0.08 to 1% by weight based on the weight of the metal oxide;

(b) heating the resulting solution to 85° C. and adding to the solution an agent of the class consisting of ammonium carbonate, ammonium bicarbonate and ammonia mixed with carbon dioxide in an amount to coprecipitate the metal salt along with the promoter and co-promoter while maintaining the solution at a pH below 7.35;

(c) calcining the precipitated material at a temperature of at least 300° C. to produce the respective corresponding oxides;

(d) densifying the calcined metal oxide composition and pelleting the densified composition in the presence of powdered stearic acid; and (e) sintering the pelleted composition at a temperature in the range of 500 to 1200° C.

6. The process of claim 5 wherein the catalytic metal oxide is cobalt oxide.

7. The process of claim 6 wherein the promoter is zirconia.

8. The process of claim 6 wherein the promoter is ceria.

References Cited

UNITED STATES PATENTS

| | | | |
|---|---|---|---|
| 2,564,331 | 8/1951 | Hawley | 252—472 |
| 3,231,519 | 1/1966 | Clark et al. | 252—462 |
| 3,235,515 | 2/1966 | Taylor | 252—472 |
| 3,267,045 | 8/1966 | Isaacks et al. | 252—472 |
| 2,776,315 | 1/1957 | Jefferson et al. | 252—463 |

L. DEWAYNE RUTLEDGE, Primary Examiner

W. R. SATTERFIELD, Assistant Examiner

U.S. Cl. X. R.

252—422, 459, 463, 473, 477